Aug. 31, 1954  V. LOMBARDI  2,687,631
GARMENT, KNITTED FABRIC, AND METHOD OF FORMING THE SAME
Filed Oct. 20, 1949  8 Sheets-Sheet 1

Inventor:
Vincent Lombardi
by Robert Irving Williams
Att'y.

Aug. 31, 1954 V. LOMBARDI 2,687,631
GARMENT, KNITTED FABRIC, AND METHOD OF FORMING THE SAME
Filed Oct. 20, 1949 8 Sheets-Sheet 2

Inventor:
Vincent Lombardi
by Robert Irving Williams
Att'y.

Aug. 31, 1954   V. LOMBARDI   2,687,631
GARMENT, KNITTED FABRIC, AND METHOD OF FORMING THE SAME
Filed Oct. 20, 1949   8 Sheets-Sheet 3

Inventor:
Vincent Lombardi
by Robert Irving Williams
Att'y.

Aug. 31, 1954  V. LOMBARDI  2,687,631
GARMENT, KNITTED FABRIC, AND METHOD OF FORMING THE SAME
Filed Oct. 20, 1949  8 Sheets-Sheet 6

Fig. 12a.

Inventor:
Vincent Lombardi
by Robert Irving Williams
Att'y.

Aug. 31, 1954 V. LOMBARDI 2,687,631
GARMENT, KNITTED FABRIC, AND METHOD OF FORMING THE SAME
Filed Oct. 20, 1949 8 Sheets-Sheet 7

Inventor:
Vincent Lombardi
by Robert Irving Williams
Att'y.

Aug. 31, 1954　　　V. LOMBARDI　　　2,687,631
GARMENT, KNITTED FABRIC, AND METHOD OF FORMING THE SAME
Filed Oct. 20, 1949　　　　　　　　　　　　　　8 Sheets-Sheet 8

Inventor:
Vincent Lombardi
by Robert Irving Williams
Att'y.

Patented Aug. 31, 1954

2,687,631

UNITED STATES PATENT OFFICE 2,687,631

GARMENT, KNITTED FABRIC, AND METHOD OF FORMING THE SAME

Vincent Lombardi, South Miami, Fla.

Application October 20, 1949, Serial No. 122,392

23 Claims. (Cl. 66—176)

1

This invention relates to knitted fabric and to methods of forming the same, and more particularly to knitted fabric composed of sections of wrap yarn mutually joined together, and to the mutual joining together of yarn-sections.

It has been customary to join multiple-wale sections or "stripes" of wrap yarn together by running "main" yarn thru them so that a multiplicity of stripes were held together by a single yarn, which, in a circular knitting machine, would be fed all around the machine. This unnecessarily thickens the fabric, adds to its cost, limits the possibilities of design variations, and often impairs its appearance.

I have found that a strong fabric of excellent appearance can be economically formed by extending the wrap yarn on one or both sides of a stripe and catching it into the juxtaposed stripe or stripes. Such catching-in can be very effectively done by extending the yarn laterally and catching it in, without knitting, between a loop in one row and a loop in an adjacent row in the edge wale of an adjacent stripe. When more secure catching-in is desired, as when inelastic yarn is to be joined to elastic yarn, or elastic yarn to elastic yarn, or when yarn is to be joined for the production of special fabrics, the yarn, in accordance with the invention in certain of its more specific aspects, may be extended laterally across several wales and back again, being caught in spaced wales—preferably in alternate wales—in one direction, and in spaced wales—preferably intermediate wales—in the other direction.

In certain other of its more specific aspects, the invention contemplates the catching-in of the yarn by plating.

In other of its more specific aspects the invention contemplates the provision of improved procedures for the formation of special fabrics.

The invention accordingly comprises the several steps and the relation and order of one or more of such steps with respect to each of the other, and the article possessing the features, properties, and the relation of elements, which are exemplified in the following detailed disclosure, and the scope of the application of which will be indicated in the claims.

For a fuller understanding of the nature and objects of the invention, reference should be had to the following detailed description taken in connection with the accompanying drawings, in which.

2

Figure 1:
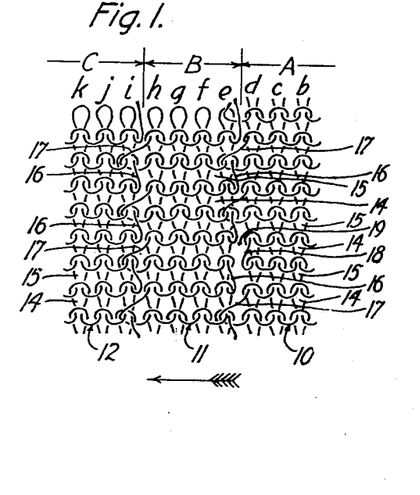
Figure 1 is a rear view of one form of fabric embodying the invention.

The form of fabric exemplified in Fig. 1 is composed of a plurality of wrap yarns of which 10, 11, and 12 are shown. Each of these yarns is knitted in a section of the fabric which comprises a limited number of wales and an unlimited number of rows. As exemplified, the yarn 10 is knitted in four wales including wales $b$, $c$, and $d$ in section A; the yarn 11 is knitted in wales $e$, $f$, $g$, and $h$ in section B; the yarn 12 is knitted in four wales including wales $i$, $j$, and $k$ in section C; and another yarn is knitted in four wales in a 4th section (not shown). Each of the yarns runs back and forth, being knitted in loops in each direction to form forward courses as shown at 14 and return courses as shown at 15.

In the present instance, the yarn of a section is caught only into the adjacent section at one side of its own section. At the other side it runs walewise from one row to another as indicated at 16 in the manner of yarn in a selvage-edge fabric. At the left side (Fig. 1), however, the yarn of a section, as it runs from one row to another, is caught into an adjacent section between the sides of a loop of one row and a loop of an adjacent row as shown at 17, in somewhat the same manner that a laid-in yarn is caught into knitted fabric. In certain instances, openwork or buttonhole effects may be obtained by omitting the tying-in action at certain points so that a yarn-portion (as 16) on one side of a section and a yarn-portion (as 18) on the adjacent side of another section both extend vertically without being caught into the contiguous section, thus providing a buttonhole or openwork portion 19.

Figures 2, 3, 6A:
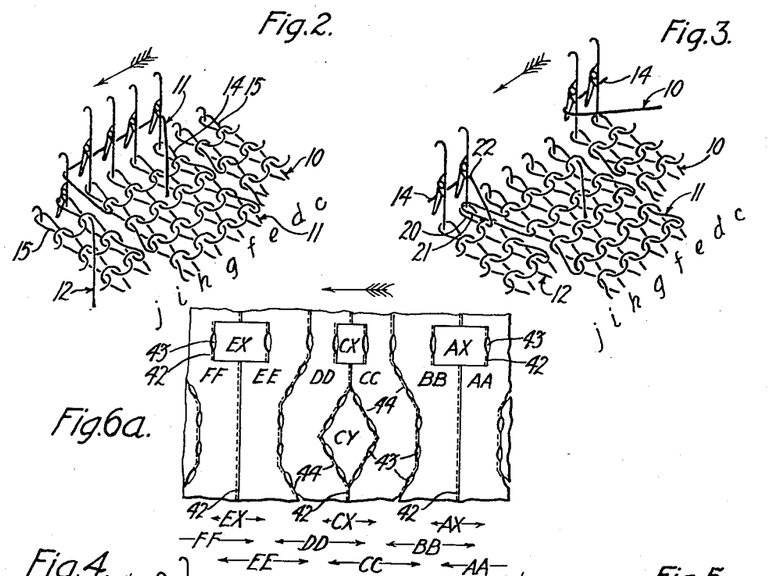
Fig. 2 is a diagrammatic view of one step in the method of producing the fabric of Fig. 1 in accordance with the invention.
Figs. 3-5 are similar views of succeeding steps.
Fig. 6a is a schematic view of a further form of fabric.

The fabric of Fig. 1 may be formed by following a method such as contemplated by the present invention. As shown in Fig. 2, after the knitting of an advance wrap 14 of the yarn 11 in the wales $e$, $f$, $g$, and $h$ and of a return wrap 15, of the yarn 10 in wales $c$ and $d$ among others, and of the yarn 12 in wales $i$ and $j$ and others to complete the independent stripes shown in the foreground, the needles in wales $e$ thru $h$ are advanced to clearing position and the needle in wale $i$ is partially advanced to tucking position, whereupon the return-wrap of yarn 11 is fed to needles $e$ thru $i$. As shown in Fig. 3, after the retraction of the advanced needles, the needles in the group of wales including $c$ and $d$ and in the group of wales including $i$ and $j$ are advanced to clearing position to receive the advance wrap of the yarns 10 and 12 respectively (Fig. 3). As indicated in wale $i$, a portion 20 of the yarn 12 and a portion 21 of the yarn 11 are both carried by the needle below the latch and are cast over the newly fed portion 22 of the yarn 12 to catch-in the portion 21 between loops formed of portions 20 and 22 in the manner shown at 18 in Fig. 1. A similar catching-in of a portion of the return wrap of the yarn 10 between loops of the yarn 11 is shown taking place in the wale $e$ of Figs. 5 and 1.

Figure 4:
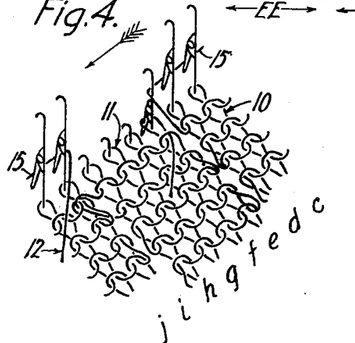
Figure 5:
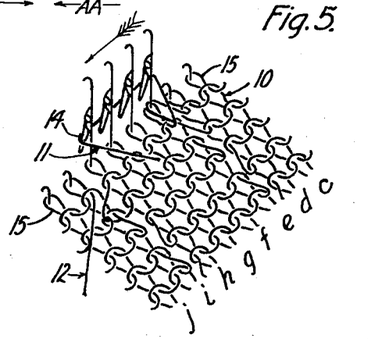

The advance wraps of the yarns 10 and 12 are shown being fed for knitting in Fig. 3, and the return wraps are shown being fed in Fig. 4. In the latter figure, the needle in wale $e$ is shown partially advanced for catching-in the yarn 10. In Fig. 5, the succeeding feeding of the advance wraps of the yarn 11 is shown.

The invention in its broader aspects is not limited to joining sections which have walewise edges nor to arrangements where the caught-in yarn is the sole joining means. In the form of construction shown in Fig. 6, a yarn 25 is knitted in section E and a yarn 26 in section F. The meeting edges of the sections are, in part, diagonal, the yarn 25 being knitted in wales 30—35 in the lowermost courses, and in only wales 30—32 in the uppermost courses. The yarn 26 is interknitted with the yarn 25 at 40. In addition, the yarn 25 is caught into the yarn 26 at 41, giving a close, firm joint.

Figure 6:
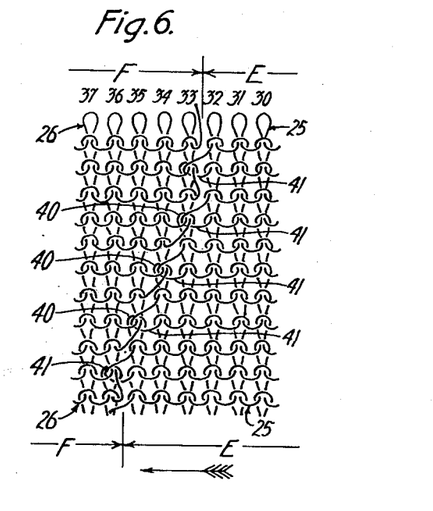
Fig. 6 is a rear view of another form of fabric embodying the invention.

In Fig. 6a there is shown a design fabric embodying stripes so joined as to provide both vertical and diagonal lines of jointure as in Fig. 6, and openwork portions as in Fig. 1. The fabric comprises sections AA, AX, BB, CC, CX, CY, DD, EE, EX, and FF, all knitted from independent wrap yarns except that the sections CX and CY are knitted of successive portions of the same yarn which may be caught-in along its vertical extent. These yarns may be all of the same color, and the fabric will still provide an attractive design, or they may be of different colors. The yarn of each right-hand section is tied-in to the loops of the section to the left thereof by being caught-in similarly to the yarn at 17 (Fig. 1) on the dotted lines 42. In the lines of jointure between the sections AA and AX, AX and BB, BB and CC, CC and CX, CC and CY, CX and DD, CY and DD, and DD and EE, EE and EX, and EX and FF, there are openwork portions 43 similar to the openwork portion 19 (Fig. 1), giving an openwork design effect. At 44 the lines of jointure run diagonally in the manner shown in Fig. 6, thus augmenting the design effect.

Figure 7:
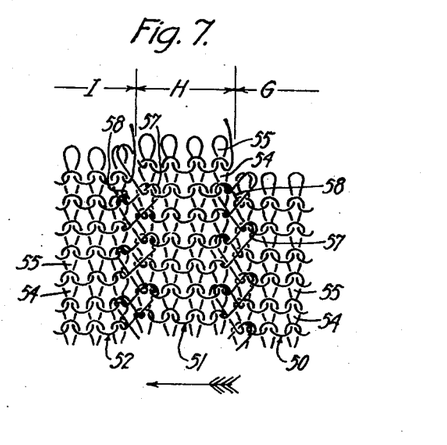
Fig. 7 is a rear view of still another form of fabric.

In many instances it is desirable that each yarn be caught in the other, and an arrangement of this type is shown in Fig. 7. Yarn 50 is knitted in section G, yarn 51 in section H, and yarn 52 in section I, the advance wraps being knitted in courses 54 and the return wraps in courses 55. The advance wrap of the yarn in each section is caught into the fabric at the left-hand wale of a right-hand section as shown at 57, and the return wrap of the yarn in each section is caught into the fabric at the right-hand wale of a left-hand section as shown at 58, thus giving a particularly firm, strong, walewise joint.

Figure 8:
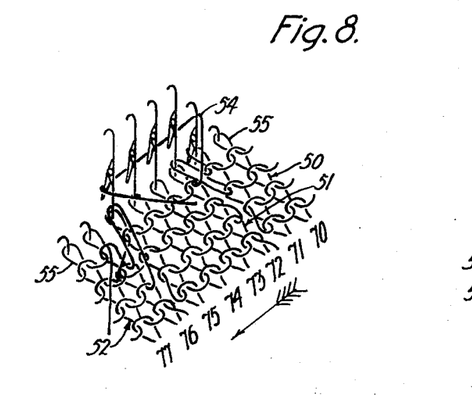
Fig. 8 is a diagrammatic view showing a step in a similar method of formation of the fabric of Fig. 7.

The fabric of Fig. 7 is formed similarly to that of Fig. 1, with the exception that the left needle of a right section is partially advanced to receive the advance wrap without knitting. As shown in Fig. 8, the needles in wales 70, 71, 76, and 77 have just knitted the return wraps of the yarns 50 and 52, these yarns at the same time having been caught on needles in adjacent sections in the manner described for the fabric shown in Fig. 1; and the needles in wales 72—75 have been fully advanced and the needle in wale 71 has been partially advanced to receive the advance-wrap of the yarn 51.

Figure 9:
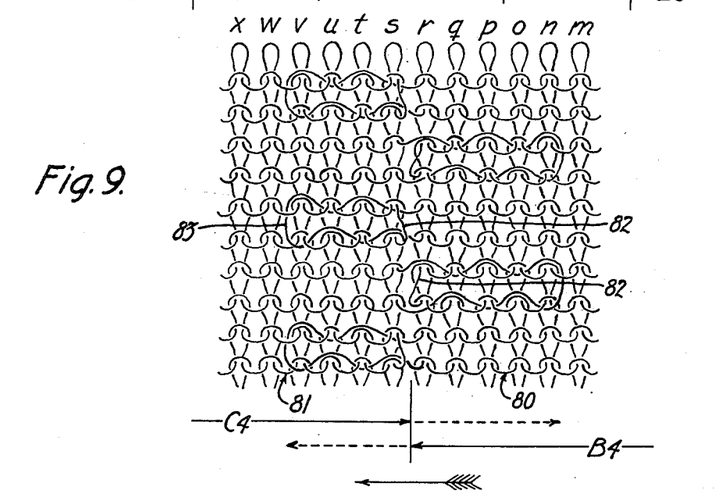
Fig. 9 is a rear view of another form of fabric embodying the invention.

Another type of arrangement for joining fabric portions which are formed of different yarns is shown in Fig. 9. A yarn 80 is knitted in section B4 which includes wales $m$ thru $r$ and a yarn 81 in section C4 which includes wales $s$ thru $x$. Each yarn extends from course to course at certain portions of the edge of the section in which it is knit merely along the edge at 82, but in other portions this yarn is extended out into an adjacent section. In the present instance, the yarn 81 extends out across wales $r$, $q$, $p$, and $o$ and $n$ of the section B4; being caught between loops of adjacent rows in wales $r$, $p$, and $n$; and back across wales $n$, $o$, $p$, $q$, and $r$; being caught between loops of one of these rows and of a succeeding row in wales $o$ and $q$, and being also caught between yarn-portions in wale $n$, a portion 83 of the yarn 80 extends out across wales $s$, $t$, $u$, and $v$ in section C4, being caught between the loops of adjacent rows in wales $t$ and $v$, and being also caught between yarn-portions in wale $s$, and extends back across wales $v$, $u$, $t$, and $s$, being caught between yarn-portions in wales $v$, $u$, and $s$. The catching between loops may be caused by partially advancing needles in wales $s$ and $u$ after the forming of the loops of the bottom row and feeding advance yarn thereto before the feeding of yarn for forming the next row, and by partially advancing needles in wales $t$ and $v$ after the forming of loops of said next row and feeding return yarn thereto before the feeding of yarn for forming the succeeding row in the usual manner. Similarly needles in wales $q$ and $o$ are partially advanced for the reception without knitting of return yarn between the last-mentioned row and the next row up and the needles in wales $n$, $p$, and $r$ are partially advanced for the reception without knitting of advance yarn between said next row up and the row above it. In the present exemplification, the yarn in rows which serve to catch-in a yarn from an adjacent section is not itself extended to be caught-in in the adjacent section.

Figure 10:
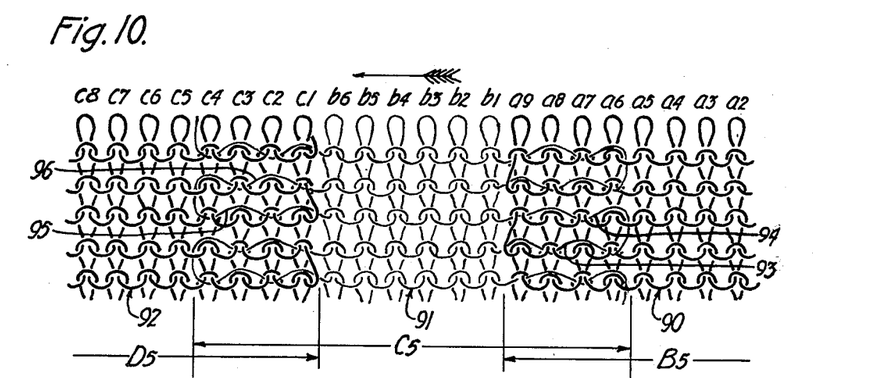
Fig. 10 is a similar view of still another form.

An arrangement where the caught-in portion of the yarn extends over several wales is particularly advantageous in joining an inelastic yarn to an elastic yarn. An arrangement of this type is shown in Fig. 10. An elastic yarn 90 is knitted in wales a2 thru a9, among others, an inelastic yarn 91 is knitted in wales b1 thru b6, and an elastic yarn 92 is knitted in wales c1 thru c8, among others. The inelastic yarn, which may be cotton, rayon, or nylon yarn, for example, is extended across wales a9 thru a6, being caught in wales a9, a8, and a6 as shown at 93, and back across wales a6 thru a9 being caught in wales a6, a7, and a9 at 94; and across wales c1 thru c4, being caught in wales c1, c2, and c4, as shown at 95, and back across wales c4 thru c1, being caught in wales c4, c3, and c1, as shown at 96. The yarn 90 may be fed by a reciprocating yarnfeed having a swing as shown at B5, the yarn 91 by a feed having a swing as shown at C5, and the yarn 92 by a feed having a swing as shown at D5. This type of jointure provides a secure attachment without tendency for the yarn to pull out. It also distributes the frictional engagement between the elastic and inelastic yarns over a plurality of wales, thereby reducing the strain on the caught-in connecting yarn portions. This is advantageous because materials including elastic yarns usually are subjected to transverse strain.

The invention is well adapted for use in garments having elastic yarn in one portion and inelastic yarn in another portion or having a plurality of sections of elastic yarn which are united by inelastic yarn. Fabric adapted for use for such purposes, as, for example, in a girdle, are exemplified in Figs. 11-13.

Figure 12:
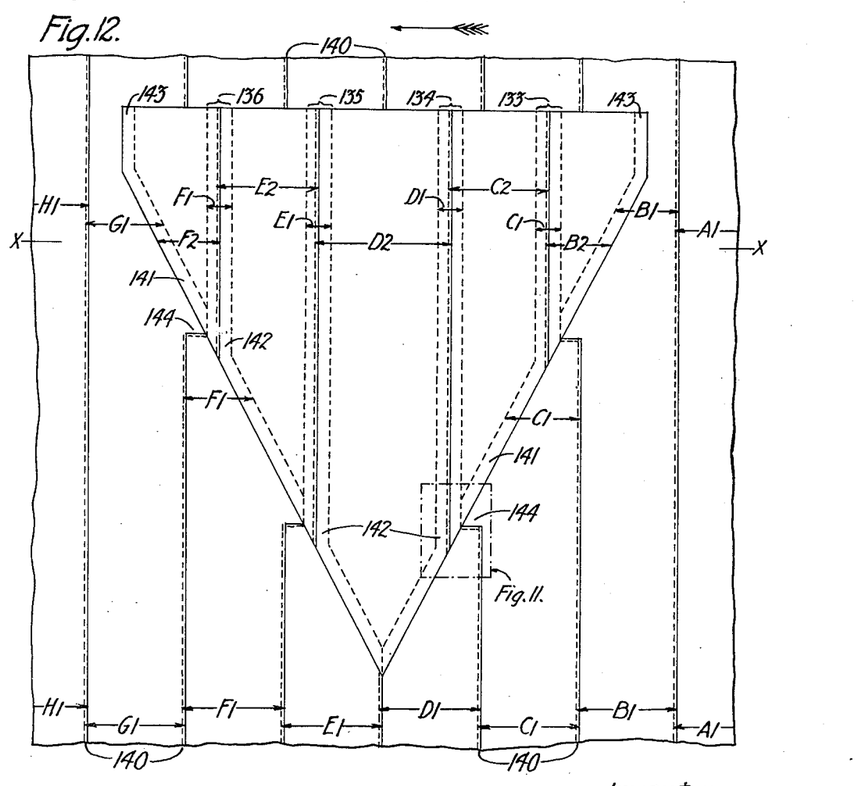
Fig. 12 is a schematic view of a portion of a garment including the fabric portion of Fig. 11, the latter being shown in dot-and-dash lines.

Fig. 12 shows a composite fabric having a triangular area of elastic yarn inserted in or surrounded by an outer area of non-elastic yarn. The inserted area may have different shapes, the triangular area in the present instance being substantially triangular. The composite fabric may be produced to have a succession of such triangular areas, as required for a plurality of garments. It may however also include a plurality of inserted areas as required for a single garment, and these areas may have different configurations. And in all such instances the elastic areas are inserted in surrounding areas of non-elastic yarn, to form a more or less continuous fabric.

As shown in Fig. 12 the triangular area of elastic yarn includes the wrap sections or stripes B2, C2, D2, E2, and F2. These may be produced by the wrap fingers B20—F20 shown in Fig. 13. The area includes at the lower portion only the wrap section D2. Further up, sections C2 and E2 are added, and thereafter sections B2 and F2. Other sections may of course be added, as required.

The surrounding area of inelastic yarn is composed of sections A1 and H1 and may include other sections. The sections D1 and E1 give way to the section D2, and depending upon the dimensions involved, may be discontinued abruptly at the upper points 144. Similarly the sections C1, B1, and F1, G1 give way to the widening triangle, and may be abruptly discontinued as required. At the points 144 the knitting is supplemented by the adjacent sections.

Figure 11:
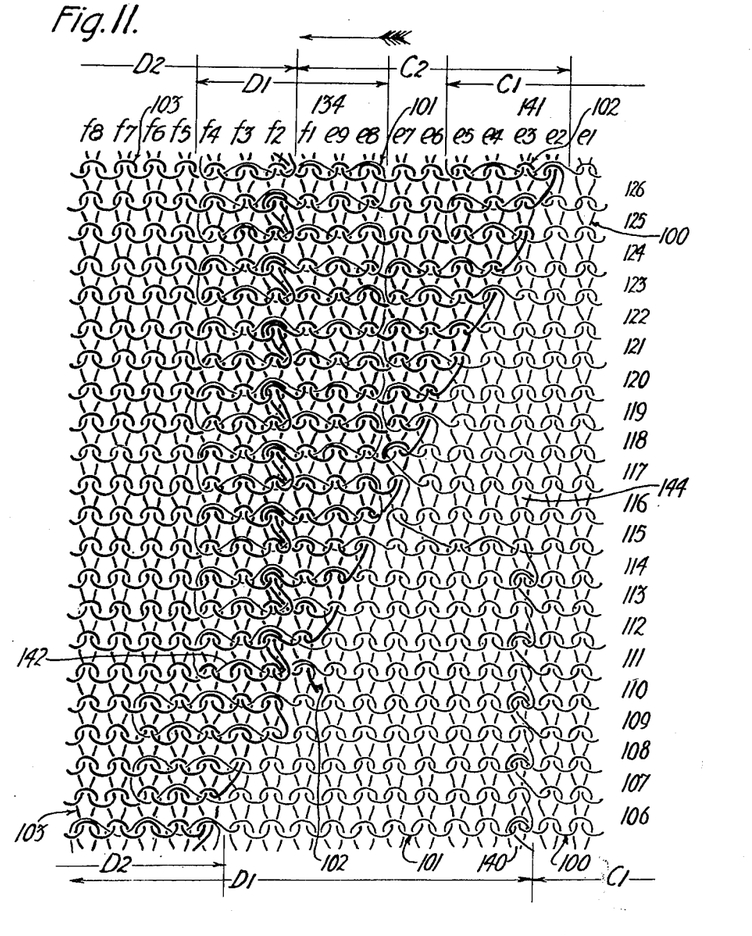
Fig. 11 is a similar view of an additional form.

In general the adjacent sections may be tied together along the edges by tying-in connections produced in the manner of any of the fabrics hereinbefore described. In the present instance the tying-in is in accordance with the method of the fabric shown in Fig. 1. However along the edges of the triangle the inelastic yarns are tied-in in accordance with the method shown in Fig. 10, and the tying-in between the elastic sections is reinforced by means of yarns from the inelastic sections somewhat in a manner as shown in Figs. 9 and 10. In Fig. 11 there are shown an inelastic yarn 100 in section C1, an inelastic yarn 101 in section D1, an elastic yarn 102 in section C2, and an elastic yarn 103 in section D2. The yarn 100 is knitted in wales e1 and e2 in rows 106—115, in wales e1—e7 in row 116, and then in one less wale in each pair of succeeding rows so as to be knitted in wales e1 and e2 in rows 125 and 126. The yarn 101 is knitted in wales e3—f3 in rows 106 and 107 and in one less wale in each pair of rows thru row 115. The yarn 102 is knitted at all of those points in wales e3—f1 in which neither the yarn 100 nor the yarn 101 is knitted; and the yarn 103 is knitted in all of those points in wales f2—f8 in which the yarn 101 is not knitted.

The yarn 100 is caught into the fabric between loops in the bottom row and row 106, rows 107 and 108, rows 109 and 110, rows 111 and 112, and 113 and 114 in wale e3; rows 114 and 115 in wales e3 and e5; rows 117 and 118 in wale e7, rows 118 and 119 in wale e7, rows 119 and 120 in wale e6, rows 120 and 121 in wales e5 and e7, rows 120 and 122 in wale e6, rows 122 and 123 in wales e5 and e7, rows 123 and 124 in wales e6 and e4, rows 124 and 125 in wales e3 and e5 and rows 125 and 126 in wale e4. The yarn 101 is caught between loops in rows 105 and 106 in wales f5 and f7, rows 106 and 107 in wales f4 and f6, rows 107 and 108 in wale f5, rows 108 and 109 in wales f2, f4, and f6, rows 109 and 110 in wales f5 and f3, rows 110 and 111 in wales f2 and f4, rows 111 and 112 in wales f3 and f1, rows 112 and 113 in wales e9, f2, and f4, rows 113 and 114 in wales f3 and f1, rows 114 and 115 in wales e9, f2, and f4, and rows 115 and 116 in wales f3, f1, and e8. The latter catching-in conformation repeats itself similarly thru succeeding rows to tie together the knitted portion of the elastic yarn 102 and the knitted portion of the elastic yarn 103. In addition, the yarn 102 is caught between the loops in the rows 111 and 112 in wale f2, between the loops in rows 113 and 114 in wale f2, and so on upwardly in this wale.

Yarns 100 and 101 are fed by yarnfeeds C10 and D10 (Fig. 13) and knitted in sections C1 and D1 (Figs. 11 and 12) and caught-in in the dotted line portions of adjacent sections at the sides of and above these sections, and other inelastic yarns are fed by yarnfeeds A10, B10, E10, F10, G10, H10 and knitted in sections A1, B1, E1, F1, G1, and H1 and caught-in in dotted-line portions at the sides of and above these sections. Yarns 102 and 103 are fed by yarnfeeds C20 and D20 and knitted in sections C2 and D2 and other elastic yarns are fed by yarnfeeds B20, E20, and F20, and knitted in sections B2, E2, and F2. There is thus provided a fabric suitable for a girdle or other garment having a substantially triangular area comprising sections B2 thru F2 of elastic yarn the intermediate edges of which are united by catching-in as in Fig. 1, and are additionally held firmly together in a non-pull-out manner as in Fig. 10 by the caught-in inelastic yarn in the portions 133, 134, 135, and 136 of sections C1, D1, E1, and F1 which extend above the diagonal edges. The garment also has an area which is outside the triangular area and which comprises the sections A1 thru H1 of inelastic yarn which are joined with each other, as in Fig. 1, in wales 140 and which join themselves to the elastic yarn area along the diagonal edge at 141 and along the vertical edge 143 (Fig. 12). It is to be noted that, when the section of knitted inelastic yarn narrows as the diagonal borderline rises, its knitting is terminated and the inelastic yarn in the adjacent section is knitted thereabove, as at 144.

Figure 12A:
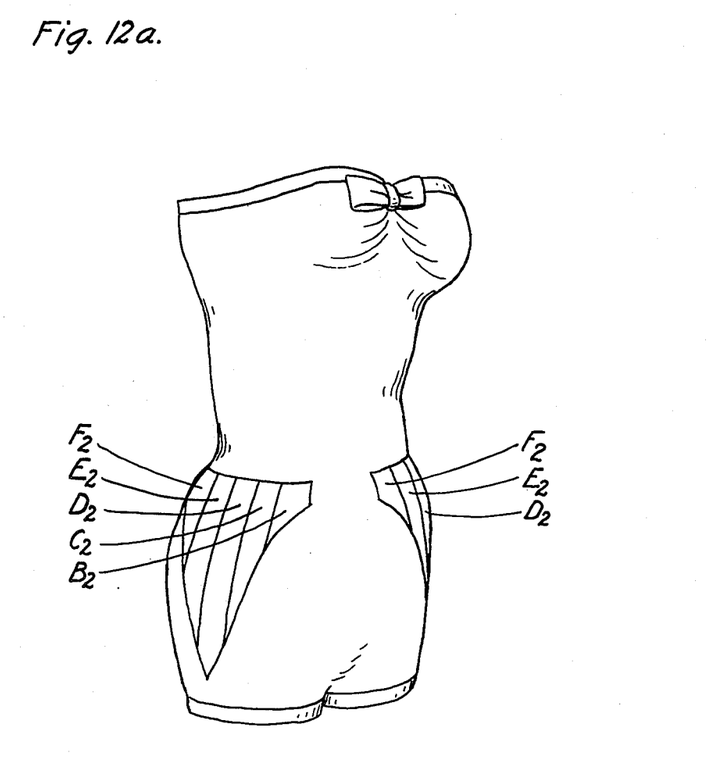
Fig. 12a illustrates a garment embodying portions constructed as shown in Fig. 12.

Constructions as shown in Fig. 12 may be utilized in garments, such, for example, as in the bathing suit shown in Fig. 12a.

Figure 13:
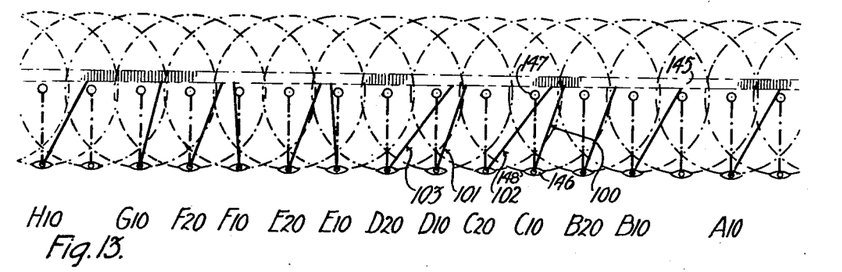
Fig. 13 illustrates a yarn-feed arrangement for the production of the fabric of Fig. 12.

Fig. 13 is a simplified top view of one form of feeding means which comprises a plurality of wrap fingers A10 to H10 and B20 to F20 shown in relation to a row of needles 145, and suitable for producing a composite fabric such as that shown in Fig. 12. The guiding head 146 for the yarn 100 is shown in its resting position with respect to the center or pivoting point 147 about which the head will swing for a wrapping action by means of an arm (not shown). Thus the guiding head 146 will traverse a circle 148 which includes at least all the needles required for knitting the section C1, in its different configurations, as shown in Fig. 12. Other similar guiding heads and centerpoints are shown for the remaining wrap sections. It may be noted that the yarns from the various guiding heads are shown as leading from the heads to certain needles in the needle row corresponding to the knitting of a row in the fabric approximately at the line $x-x$ in Fig. 12.

Figures 14, 15, 16:
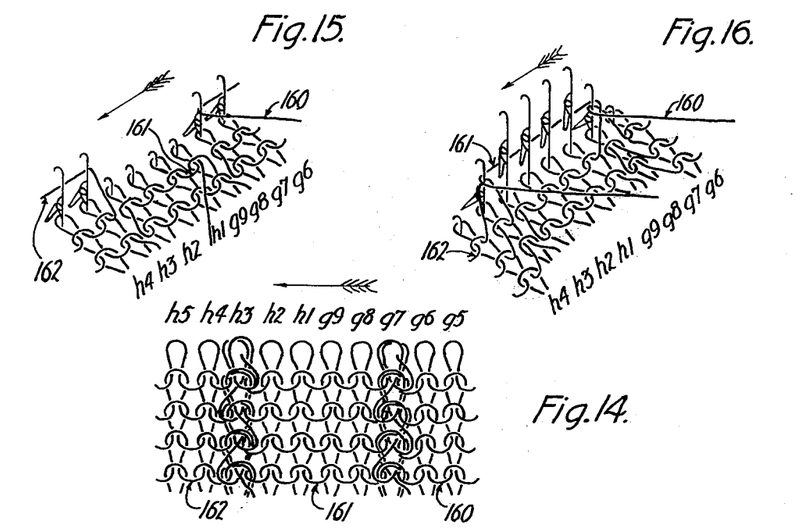
Fig. 14 is a rear view of another form of fabric embodying the invention.
Figs. 15-21 are diagrammatic views of successive steps in the formation of fabric of Fig. 14 by a method embodying the invention.

In the fabric of Fig. 14 the yarn of the stripes are plated in wales disposed along the edges of the stripes, for the purpose of securely tying the stripes or sections together into a continuous fabric. Yarn 160 is knitted by itself in a plurality of wales including wales $g5$ and $g6$; yarn 161 is knitted by itself in wales $g8$, $g9$, $h1$ and $h2$; and yarn 162 is knitted by itself in a plurality of wales including wales $h4$ and $h5$. Yarns 160 and 161 are plated in wale $g7$ and yarns 161 and 162 are plated in wale $h3$.

Figure 17:
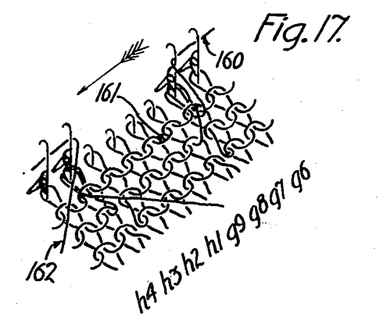

Fabric as shown in Fig. 14 may be formed as illustrated in Figs. 15–21. In Fig. 15 there are shown independent stripes of the yarns 160, 161, and 162 on needles which are about to be manipulated to form the fabric of Fig. 14. Yarn 160 is being fed to needles of the right-hand group and yarn 162 to needles of the left-hand group by forward swings of yarnfeeds (not shown), it being noted that the needles $g7$ and $h3$ are receiving yarn. In Fig. 16 the yarns 160 and 162 have been knitted on all their needles except those in wales $g7$ and $h3$, and yarn 162 is being fed, by a forward swing of an intermediate yarnfeed (not shown), to the center needles as well as needles at wales $g7$ and $h3$, the latter being raised only to tucking position so as not to clear the yarns 160 and 162 thereon, respectively. In Fig. 17 the needle at $g6$ and its group have been raised to clear the yarn 160, the needle $g7$ has been raised to clear the yarns 160 and 161 after knitting of the preceding loop over these yarns, the needle at $h3$ has been raised to catch the yarns 161 and 162 after knitting the preceding loop, and the needle at $h5$ and its group have been raised to clear the yarn 162. In this manner two plated loops have been formed by the yarns from adjacent sections by a return swing of its yarn-feed, the yarn 160 has been fed to the advanced needles at $g7$ and $g6$, and by a return swing of its yarnfeed the yarn 162 has been fed to the advanced needles at $h4$ and $h3$.

Figure 18:
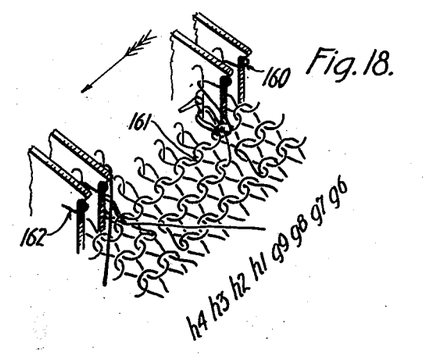

In Fig. 18 sinkers are shown as having been moved inwardly in the direction left to right to draw out the return yarn to avoid binding of the yarn on retraction of the needles in the usual sequence right to left for the formation of loops since the needle next to the yarnfeed is the first retracted.

Figure 19:
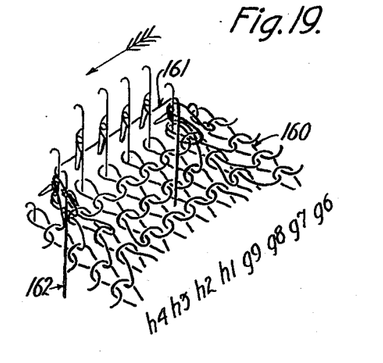
Figure 20:
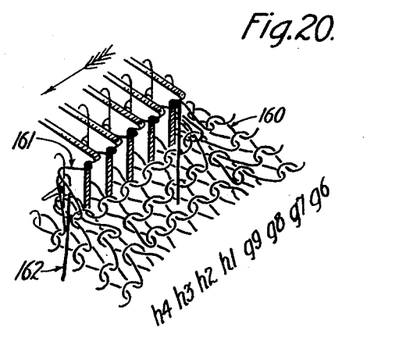

Fig. 19 shows the yarns 160 and 162 as having been knitted on all their needles except those at $g7$ and $h3$ and further shows the feeding by a return swing of the yarn 161 to needles at wales $h3$, $h2$, $h1$, $g9$, $g8$, and $g7$, the first and last being only partially advanced; and Fig. 20 shows sinkers moved inwardly to draw out the return yarn to prevent binding on retraction of the needles for formation of the loops in the order from right to left.

Figure 21:
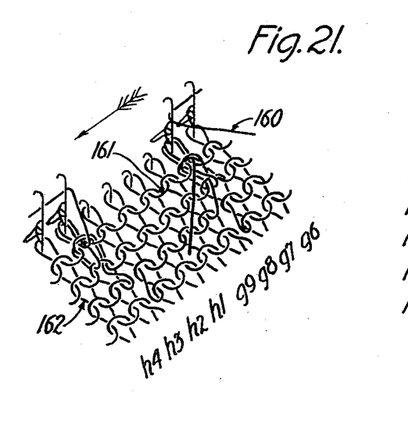

Fig. 21 shows a repetition of the procedure of Fig. 15, after two courses have been formed. In the present instance the yarn 161 in the middle section is plated on the back of the adjacent sections in wales $g7$ and $h3$ so that it will not appear on the front of the fabric in these wales. It should be understood that the yarn 161 may be formed into loops appearing on the front of the fabric in either of the wales $g7$ or $h3$ or in both, as desired.

Figure 22:
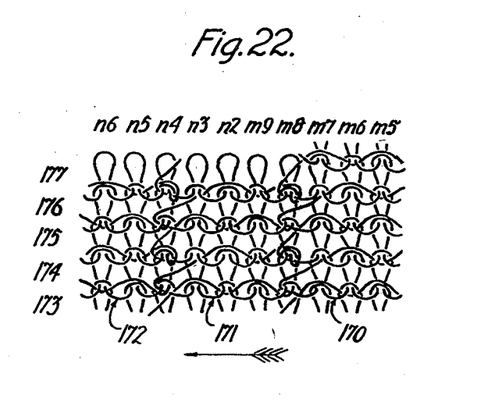
Fig. 22 is a rear view of still another form of fabric.

The invention in its broader aspects is adapted to be embodied in fabric wherein the tied-in stripes are composed of wrap yarn knitted in one direction and caught-in in the other direction. One fabric of this character in which the tying-in between stripes is in accordance with the arrangement shown in Fig. 1 is shown in Fig. 22, wherein yarn 170 is shown with its advance portion knitted in wales $m5$, $m6$, and $m7$; yarn 171 is shown with its advance portion knitted in wales $m8$, $m9$, $n2$, and $n3$; and yarn 172 is shown with its advance portion as knitted in wales $n4$, $n5$, and $n6$. The return portion of yarn 170 is caught between loops in rows 173 and 174 in wales $m7$ and $m5$ and later in wale $m8$ and between loops in rows 174 and 175 in wales $m8$ and $m6$ and later between loops in rows 174 and 175 in wale $m8$, between the loops in rows 175 and 176 in wales $m7$ and $m5$, and so on upwardly. Yarn 171 is similarly caught-in in wales $n2$, $n4$, and $n4$, $n3$ and $m9$, etc. Yarn 172 is similarly caught-in at points of catching-in in wales $n6$ and $n5$.

The arrows appearing in most of the figures of the drawings are intended to indicate the direction of general rotation of the machine, yarn being fed in the same direction by the advance swing of the yarn feeds and in the opposite direction by the return swing of the yarn feeds.

Since certain changes in carrying out the above method, and certain modifications in the article which embody the invention may be made without departing from its scope, it is intended that all matter contained in the above description or shown in the accompanying drawing shall be interpreted as illustrative and not in a limiting sense.

I claim:

1. A knitted fabric composed of a multiplicity of plural-wale stripes of wrap yarn united by unknitted holding means consisting of yarn from at least certain of the stripes between loops in one row and sinker loops in an adjacent row which extend laterally thereof and are caught into the yarn of other stripes to interconnect juxtaposed stripes in various courses.

2. A knitted fabric composed of a multiplicity of plural-wale stripes of wrap yarn united by unknitted holding means consisting of catching yarns of various stripes between loops in one row and sinker loops in an adjacent row into certain juxtaposed stripes without knitting.

3. A knitted fabric composed of a multiplicity of plural-wale stripes of wrap yarn united by unknitted holding means consisting of catching yarn of at least certain stripes in the stripes on each side thereof without knitting.

4. A knitted fabric composed of a multiplicity of plural-wale stripes of wrap yarn united by unknitted holding means consisting of catching the yarn of a stripe into the adjacent wale of another stripe without knitting.

5. A knitted fabric composed of a multiplicity of stripes of wrap yarns, each of which is knitted in opposite directions in successive courses, said yarns being united by being caught together at the sides of the stripes by the catching of each of a plurality of unknitted portions thereof between a loop in one row and a sinker loop in an adjacent row of knitted yarn.

6. A knitted fabric composed of a multiplicity of stripes of yarns, each of which is knitted in opposite directions in successive courses, said yarns being united by catching at least one of the yarns between a loop in one row and a sinker loop in an adjacent row in at least one wale of another yarn while said one yarn extends in one direction, and between a loop in one row and a sinker loop in an adjacent row of another wale of said other yarn while said one yarn extends in the other direction.

7. A knitted fabric composed of a multiplicity of stripes of yarns, each of which is knitted in opposite directions in successive courses, said yarns being united by catching at least one of said yarns between loops in a pair of rows of another yarn without knitting as said one yarn extends in one direction across several wales of said other yarn and between loops of rows of said other yarn without knitting as said one yarn extends in the other direction across several wales of said other yarn.

8. A knitted fabric composed of a stripe of elastic yarn and a juxtaposed stripe of inelastic yarn, said stripes being joined by catching the inelastic yarn into the stripe of elastic yarn without knitting.

9. A knitted fabric composed of a multiplicity of plural-wale stripes of wrap yarns, each of which is knitted in opposite directions in successive courses, said yarns being united by catching yarn extending laterally of each of juxtaposed stripes into the stripe on each side thereof by the catching of each of a plurality of unknitted portions thereof between a loop in one row and a sinker loop in an adjacent row of knitted yarn.

10. A fabric comprising a multiple-wale section in which one yarn is knitted, an adjacent but independent multiple-wale section in which another yarn is knitted, and a third yarn caught into the fabric of both sections along their adjacent edges without knitting and joining said sections but not extending across either of them.

11. A fabric comprising a multiple-wale section composed of elastic yarn, an adjacent but independent multiple-wale section composed of elastic yarn, and an inelastic yarn caught into the fabric of both sections along their adjacent edges without knitting and joining said sections but not extending across either of them.

12. A garment comprising a plurality of adjacent sections knitted of independent elastic yarns, inelastic yarn joining certain juxtaposed edges of said sections by being caught therein without knitting, and inelastic yarn knitted adjacent to said plurality of sections and joined thereto by being caught therein.

13. A knitted fabric comprising an insert of one yarn, said insert having a diagonal edge, a short section of another yarn having a diagonal edge portion mating with a portion of said diagonal edge, a section of additional yarn which is longer than said short section and which has a straight edge portion mating with an edge of said shorter section and a diagonal edge portion mating with a portion of the first-mentioned diagonal edge, said short section terminating before said straight edge thereof meets said diagonal edge thereof, and said longer section being wide enough to extend from the end of said straight edge to said first-mentioned diagonal edge.

14. A fabric as set forth in claim 1 wherein the wrap yarn is knitted in both directions in at least certain of the stripes.

15. A fabric as set forth in claim 1 wherein the wrap yarn is knitted in one direction and caught into the fabric without knitting in the other direction in at least certain of the stripes.

16. A design fabric comprising a multiplicity of wrap yarns individually knitted in various multiple-wale sections and united by yarns of various sections which extend laterally and are caught in juxtaposed sections, said catching-in being omitted at symmetrically-disposed juxtaposed edge portions extending over a plurality of courses to provide an openwork design effect, the catching-in extending along greater overall lengthwise distances than the portions where the catching-in is omitted.

17. The method of knitting which comprises substantially simultaneously forming a multiplicity of multiple-wale stripes of knitted wrap yarn and joining the edges of said stripes by catching yarn of one stripe between loops in one row and sinker loops in an adjacent row of yarn of an adjacent stripe.

18. The method of knitting which comprises knitting each of a plurality of wrap yarns first in one direction and then in the other and catching each of a plurality of said yarns into the loops of other yarn knitted on one side thereof by the catching of each of a plurality of unknitted portions thereof between a loop in one row and a sinker loop in an adjacent row of knitted yarn.

19. The method of knitting which comprises fully advancing a group of knitting needles to receive a yarn for knitting loops, partially advancing an end needle of said group and fully advancing the needles of another group to catch another yarn in with the aforesaid loops and retracting the needles to knit loops of said other yarn, and partially advancing an end needle of said other group and fully advancing the needles of an additional group to receive an additional yarn and retracting the advanced needles to catch said additional yarn in with the last mentioned loops and to knit loops of said additional yarn.

20. The method of knitting which comprises fully advancing a group of knitting needles to receive a yarn and to knit loops thereof, partially advancing an end needle of said group and fully advancing the needles of another group to catch another yarn in with the aforesaid loops and retracting the needles to knit loops of said other yarn, and partially advancing an end needle of said other group and fully advancing the needles of an additional group to receive an additional yarn and retracting the advanced needles to catch said additional yarn in with the last mentioned loops and to knit loops of said additional yarn, and fully advancing the needles of each of said groups after the aforesaid knitting operation thereof to receive a portion of its yarn extending in an opposite direction and retracting the advanced needles to knit said yarn.

21. The method of knitting which comprises substantially simultaneously forming a multiplicity of stripes of knitted wrap yarn with at least certain yarn-portions which run in a given direction caught-in without knitting, and joining the edges of said stripes by catching yarns of one stripe in with yarns of an adjacent stripe.

22. A design fabric comprising a multiplicity of wrap yarns individually knitted in various sections and united by yarn of various sections which extend laterally and are caught in juxtaposed sections without knitting, said catching-in being omitted at symmetrically-disposed juxtaposed edge portions extending over a plurality of courses to provide an openwork design effect.

23. A design fabric comprising a multiplicity of wrap yarns individually knitted in various multiple-wale sections and united by yarns of various sections which extend laterally and are caught in juxtaposed sections, said catching-in being omitted at symmetrically-disposed juxtaposed edge portions extending over a plurality of courses to provide an openwork design effect, certain of said lines of jointure running diagonally.

References Cited in the file of this patent

UNITED STATES PATENTS

| Number | Name | Date |
|---|---|---|
| 721,190 | Hirner | Feb. 24, 1903 |
| 928,165 | Wilson et al. | July 13, 1909 |
| 1,025,125 | Costello | May 7, 1912 |
| 1,120,506 | Kilbourn et al. | Dec. 8, 1914 |
| 1,150,548 | Scott | Aug. 7, 1915 |
| 1,166,147 | Nelson | Dec. 28, 1915 |
| 1,229,369 | Wilson | June 12, 1917 |
| 1,234,703 | Scott | July 24, 1917 |
| 1,618,763 | Lipper | Feb. 22, 1927 |
| 1,672,873 | Bacon et al. | June 12, 1928 |
| 1,919,292 | Field | July 25, 1933 |
| 1,929,006 | Snader | Oct. 3, 1933 |
| 2,009,294 | Getaz | July 23, 1935 |
| 2,023,371 | Lombardi | Dec. 3, 1935 |
| 2,029,879 | Lindley | Feb. 4, 1936 |
| 2,038,318 | Sanders | Apr. 21, 1936 |
| 2,103,133 | Adamson | Dec. 21, 1937 |
| 2,104,538 | Goldsmith | Jan. 4, 1938 |
| 2,150,100 | Lasch | Mar. 7, 1939 |
| 2,181,836 | Smetana | Nov. 28, 1939 |
| 2,216,051 | Smith et al. | Sept. 24, 1940 |
| 2,217,022 | Lawson et al. | Oct. 8, 1940 |
| 2,229,105 | Lombardi | Jan. 21, 1941 |
| 2,286,227 | Ralston | June 16, 1942 |
| 2,373,126 | Lombardi | Apr. 10, 1945 |
| 2,378,780 | Lombardi | June 19, 1945 |
| 2,435,068 | Bellamy | Jan. 27, 1948 |
| 2,451,214 | Green | Oct. 12, 1948 |

FOREIGN PATENTS

| Number | Country | Date |
|---|---|---|
| 265,513 | Germany | Oct. 7, 1913 |